Jan. 15, 1957     M. GAMBILL     2,777,818
COMPOSITION AND METHOD FOR CONTROLLING SCALE IN OIL WELLS
Filed Oct. 8, 1954
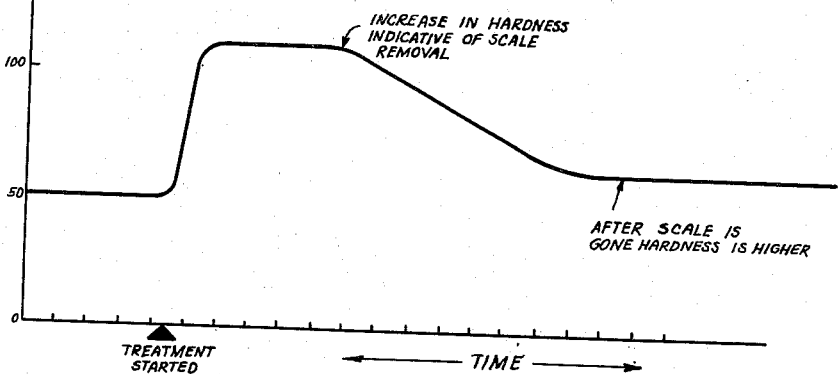
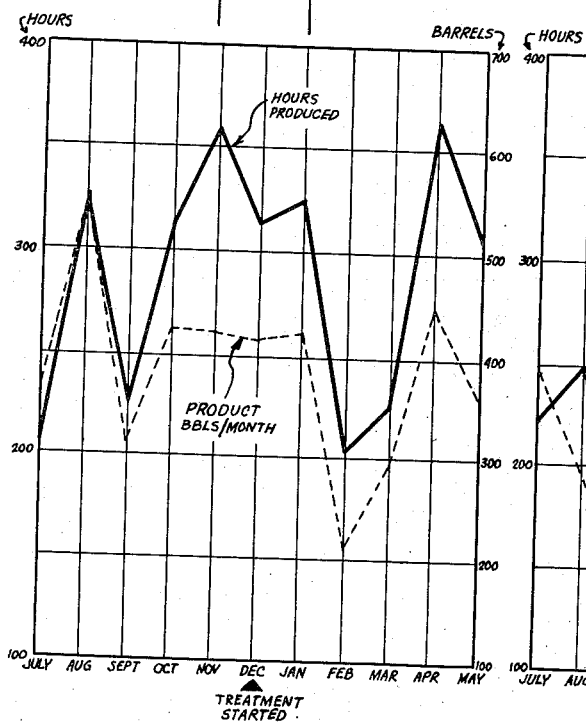
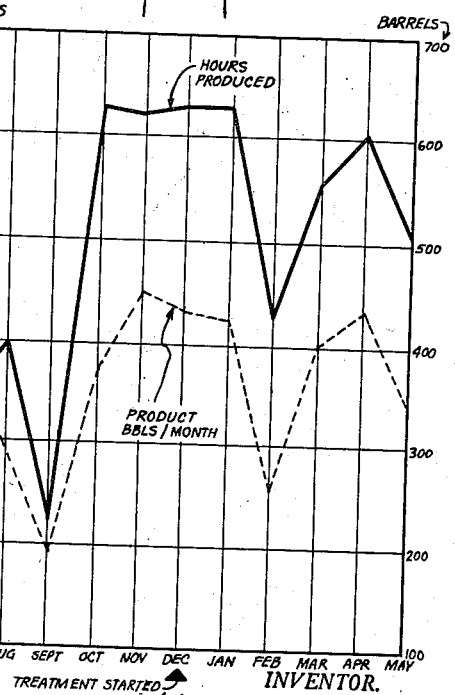
INVENTOR.
MARVIN GAMBILL
BY Darby & Darby
ATTORNEYS

2,777,818

COMPOSITION AND METHOD FOR CONTROLLING SCALE IN OIL WELLS

Marvin Gambill, Hobbs, N. Mex., assignor to United Chemical Corporation of New Mexico, Hobbs, N. Mex.

Application October 8, 1954, Serial No. 461,063

6 Claims. (Cl. 252—8.55)

This invention relates to a composition and method for loosening, dissolving and removing iron oxide, calcium sulfate, calcium carbonate, magnesium sulfate, magnesium carbonate and other scales which form in oil and gas wells, their flow lines and kindred treating equipment, heat exchangers, and cooling towers.

One of the most serious contributing factors to the high cost of pumping oil from a well is fouling of the tubes and pump in the bottom of the well, because with such fouling and buildup of scale there comes a reduction in oil flow which ultimately becomes serious enough to require pulling the pump and tubes for cleaning. In the scale commonly there will be found a proportion of iron oxide, which can be attributed to the presence of the steel rods and tubes, and calcium or alkaline earth salts, traceable to the formation itself. A common ingredient of the scale is calcium sulfate derived from the formation and from compounds occurring in the oil. The scale is extremely hard and once the accumulation has become significant it must be removed. Not only is its removal necessary, but the prevention of the formation of additional scale, as well as the avoidance of corrosion and emulsification with formation water, are desirable. Accordingly, it is a fundamental object of this invention to provide a composition useful for introduction into oil wells to dissolve, loosen and assist in the removal of scale present in the well and to perform the same functions when used in flow lines, treating equipment, cooling towers, and heat exchangers.

It is another object of the invention to provide a composition useful not only in dissolving and removing scale but also in the prevention of the formation of additional scale.

It is a further object of the invention to provide a composition useful for breaking emulsions of oil formed with the formation water.

Other objects and advantages of the invention will in part be apparent and in part appear hereinafter.

The invention, accordingly, is embodied in a composition useful in application to oil wells, flow lines, treating equipment, cooling towers, and heat exchangers, in aqueous solutions the composition being characterized by the presence therein of an alkali metal polyphosphate complexing compound, a synthetic polyamino polycarboxylic acid chelating agent, a glucoside complexing and de-emulsifying agent, such as cactus extract, a protective colloid, such as carboxymethyl cellulose and a corrosion inhibitor, the composition being formulated as a blend of these ingredients dry or in concentrated aqueous solution; the method is characterized by the addition of this composition to formation water which is circulated into the well so that contact of the composition with scale in the pump and in the lower section of the well is accomplished. The invention, accordingly, is embodied in the composition having the ingredients and combinatons of ingredients hereinafter to be described in greater detail, and in the method involving the steps and combinations of steps as related to the accomplishment of the invention also to be hereinafter described in greater detail.

The figures of the drawing illustrate typical time water hardness curves, showing the progress or change in water hardness obtained from a well before and after treatment with the composition.

The composition which may be considered typical of the invention is the following:

For one barrel—
 200 lbs. sodium tripolyphosphate,
 50 lbs. dry tetra sodium salt of ethylenediamine tetraacetic acid,
 40 lbs. cactus extract, 10% aqueous solution,
 10 lbs. sodium bichromate,
 10 lbs. carboxymethyl cellulose,
 Sufficient water to make 651 lbs.

The proportions of the ingredients listed may be varied within ranges such that the amount of the polycarboxylic amino acid chelating agent may be equal in weight to that of the tripolyphosphate, or 10 parts of the tripolyphosphate to 1 part of the polyamino polycarboxylic acid. The proportion of cactus juice, or extract, on an anhydrous basis is related to the polyamino carboxylic acid and it may be present in amount about equal thereto in weight, or the polycarboxylic amino acid may be in excess of the cactus juice by an amount of 5 to 1 to 10 to 1. The protective colloid, or the carboxymethyl cellulose, is preferably related to the total of active ingredients and amounts to at least about 1 percent to 5 percent of the other ingredients on a dry weight basis.

The polyphosphates are generally commercially available as such, a common form being the sodium tripolyphosphate which is commonly sold for use in detergent materials.

The polyamino polycarboxylic acid ingredient is an organic chelating agent, typical ones being ethylenediaminetetraacetic acid, monoethanolethylenediaminetriacetic acid, or diethanolethylenediaminediacetic acid, as their alkali metal salts, or mixtures of these compounds. Other useful chelating agents of the general class are nitrilotriacetic acid, hydroxyethyl imino diacetic acid and dihydroxyethyl glycine, triethanolamine and various combinations thereof. Generally those organic chelating agents which are most effective in approximately neutral or alkaline solution in the complexing of alkaline earth metals are preferred for use in the operation.

The cactus extract is used for its polyglycoside content which is useful in dispersion of scale particles in colloidal form in the solution. It is obtained from the common elephant leaf type cactus of Texas and is commercially available as an extract or dehydrated product which is prepared by dehydrating the cactus and grinding it to a powder. The powder is then extracted with water and the water soluble portion thereof used. The cactus juice or extract has been called "mothobetic alcohol" by some users thereof.

As substitutes for the sodium bichromate corrosion inhibitor, ferro-ferric cyanides and sulfites, or other agents for that purpose may be used.

The composition made up in accordance with the formulation quoted is used in an amount which is related to the total hardness of the water being obtained from the well. Thus, for example, the composition concentrate, which has the texture of a paste, is added in the proportion of one pint thereof to five gallons of water, or lesser amount, and the solution thus prepared is added to a well by injection between the casing and the tubing over a period of 24 hours, the five gallons of solution being proportioned to control 200,000 to 600,000 grains of hardness expressed as calcium carbonate or calcium sulfate. Although continuous injection of the composition mixture is preferred, injecting once per day either down the tubing or into the tubing-casing annulus is effective.

This same composition added to the well, by its presence, serves as an emulsion breaker and corrosion inhibitor in the system.

By using one pint of the composition paste as described per 200,000 grains of hardness the well water or formation water will pick up additional hardness from the formation, which may be calculated as calcium carbonate or calcium sulfate, so that ultimately when equilibrium is established the water being obtained from the formation will have a hardness considerably higher than it could have were the water taken directly from the formation, thereby indicating that substantial portions of the scale in the well have been removed.

The composition may also be prepared by mixing the dry ingredients and spraying onto the dry ingredients a concentrated solution of the cactus juice, the total mixture then being milled and packaged as a dry powder.

As a typical example of its application:

A well was flowing and yielding water having a hardness of 60 grains per gallon. The composition in the proportion indicated was added to the formation water being circulated in the well. Shortly the hardness rose to 110 grains per gallon.

A graphic illustration of the course the water hardness will follow is given in the generalized curve of Fig. 1.

When used in oil wells for control of scale the composition may be used in an amount from about 1 pint of the paste to 5 gallons of water added to 150 to 250 barrels of formation water, depending upon the hardness thereof, over a 24 hour period. The factors indicating the proportionation are as follows:

| Formation Water Hardness | Amount of Composition | Volume of Formation Water |
| --- | --- | --- |
| 50–100 grains/gal | 1 pint | 100–300 bbls./24 hrs. |
| 100–150 grains/gal | 1 quart | 300–400 bbls./24 hrs. |
| 150–200 grains/gal | 3 pints | 300–more bbls./24 hrs. |

When circulated in wells in about this proportion a remarkable degree of scale control in the bottom of the well is effected and, by controlling the dosage rate of the well solely on the amount of water produced in the well, control of scale formation may be accomplished.

Although the mechanism by which the material functions is somewhat obscure and subject to some speculation, the following is offered as a possible explanation. When the composition is added to a well at the rate recommended results are not noted until the passage of a few days and, in extreme cases, the improvement does not appear for a week or two. In all cases the hardness of water which was mixed with the oil produced from the well showed an increase after treatment with the composition, which increase finally levelled off and, after an irregular period, it would then drop back toward its original level, but never actually reach the lower level prior to treatment (as generalized in Fig. 1).

Figs. 2 and 3 show production-time curves for a pair of wells which were treated as outlined, i. e., by metering the composition into the well and proportioning it to the amount of formation water being circulated and its total hardness. In each case it is apparent from the curves that the wells had become uneconomical for oil yield was not directly proportional to the time of production. Ultimately, this great separation of the two curves dictates shutting down the well. In each case the treatment in accordance with this invention was started at the point marked, with the result that within about one month the gross production curve and the gross time produced curve again became parallel.

Test specimens of scale which were studied almost invariably contained calcium sulfate, which when immersed into dilute solutions of the composition showed a remarkable degradation of the calcium sulfate crystal. The degradation was either in the formation of a large number of small crystals or reduction thereof to an amorphous form. Based on this observation, it would appear that the calcium sulfate scale in the well is chemically reduced to fine particles which are then emulsified and carried away by the composition. Thus the mechanism may be postulated as follows:

When the composition is dissolved in water and metered slowly into a casing, it settles through the oil layer in the tube and finds its way into the bottom water layer where most of the scale is produced. The temperatures in the bottom of the well are generally in the range from 100° F. to above the boiling point of water and the pressures are extremely high. While a high temperature would tend to make the calcium sulfate less soluble, the tremendous pressure would have the opposite effect and would tend to keep calcium sulfate in solution. When the pressure is released, however, the high temperature which makes the calcium sulfate less soluble would tend to grow large crystals of calcium sulfate in the formation adjacent to the hole and the tube itself.

When the composition is added to the water it, of course, comes in intimate contact with the calcium sulfate crystal. The large calcium sulfate crystal is either broken up or converted to microscopic crystals which are suspended in the water. The suspended calcium sulfate is then pumped out of the well with the water and if the hardness of this water is tested the hardness test shows the normal hardness of the water plus that amount of calcium which resulted from breakdown of the calcium sulfate crystals. After all of the calcium sulfate has been broken down or removed from the sand face and tube, the water hardness then becomes lower, but does not regain its original value inasmuch as all of the calcium sulfate contained in the natural water flows from the well and none of it is precipitated on the tubes. Any calcium sulfate which is precipitated on the tubes would, of course, lower the dissolved hardness of the water.

Calcium sulfate taken from the sand face would, of course, increase the porosity of the formation and would lead to increased production of oil.

Other applications for the composition are practical and it can be used as an additive to drilling mud. The drilling mud which is very widely used in the southwest is the sodium form of bentonite clay. This material is quite satisfactory until the drilling bit hits a stratum having high calcium content. In most cases when drilling through beds of calcium sulfate or calcium carbonate, difficulty is encountered with the bentonite drilling mud. Apparently an ion exchange takes place with the formation of a calcium bentonite, which tends to crystallize and make the drilling mud curdy. One explanation of this is that crystal growth of the calcium bentonite may be expected. Surface friction with a large particle size would logically be much greater than with a small particle size. Consequently, if the composition controls the particle size of crystals, the presence of a small amount of this material is of advantage in drilling mud, since it prevents the formation of large crystals of calcium bentonite and consequently viscosity is maintained at a more nearly constant level.

The composition in an effective bactericide through its ability to dormatize the bacteria by eliminating the products upon which the bacteria feed. Treatment of water such as is injected in creating artificial water drives in the secondary recovery of oil results in segregating the bacteria from its food, ferrous and sulfate ions.

The composition has corrosion inhibiting properties through its ability to preferentially wet and deposit a protective film on the metal in the well bore, giving a non-penetrable surface to the corrosive components of the oil, water, and gas.

The following results obtained with the specific treatments of particular wells will summarize the effectiveness of the composition:

Well No. 1

This well was about six years old and when brought in it had yielded under pressure about 50 barrels of oil and about 10 barrels of water per day. Following six months of production it lost its pressure and had to be pumped. After three years of pumping the oil yield was down to about 2 barrels of oil per day with about 40 barrels of water. A treating schedule was adopted for the well after the well had been shut down for about six months, since it had already been decided that it was not worth pumping. The composition as described was fed into the closed well for about two weeks. At the commencement of the treatment the well had virtually no pressure, but when checked after several weeks of the treatment the bottom hole pressure had risen to about 2500 pounds per square inch. The well was then put into production has remained a free flowing well for the past six months producing about 40 barrels of oil per day with 30 barrels of water.

Well No. 2

Since definite results have been obtained in a nine months' test, a review of operations from the start of production will be given. The well was potentialed at 389 barrels of oil after stimulation with 1000 gallons of acid. Although this well was completed as a flowing well in February, A, by March, A, it was necessary to place it on the pump. At this time it was repotentialed for 239 barrels of oil per day. By August, A, it was necessary to treat the well with 3000 gallons of acid to obtain top allowable. In December, A, the well was reperforated and treated with 4000 gallons of acid. In May, B, the perforations were washed with water and in August, B, they were washed with 1000 gallons of acid. In January, C, 25 feet of additional sections were perforated and the well treated with 750 gallons of gel and 3000 gallons of low-tension acid. This resulted in the well being re-potentialed at 69 barrels of oil per day. By October, C, production had declined considerably and in January, D, the well was re-treated with acid. Apparently, it was a continuous cycle of plugging in the well bore and across the perforations which caused the well to drop in production between the stimulations. In March, D, the first treatment with the composition of this invention was initiated in this well. In October, D, the well overproduced for the first time since March, A. On January 20, E, this well tested 108 barrels of oil and 161 barrels of water in 24 hours.

Well No. 3

This well was drilled to approximately 3800 feet and completed as an oil producer. Difficulties were experienced with calcium deposition in the tubing while the well was flowing, and after it was equipped to pump, these difficulties were amplified in the short pump runs which averaged from 45 to 60 days in length. A descaling treatment was supplanted by treatment in accordance with this invention. Treatment has consisted of mixing one-half gallon of the composition paste to five gallons of water and pumping it down the casing every five days. Since starting treatment it has not been necessary to pull the pump.

Well No. 4

This well, completed to a depth of 3810 feet, started making 4½ percent water in January, A, and the percent of water has since increased to between 60 and 70. A conventional treatment was started in January, B, and on April 7, B, it was necessary to install a pumping unit to maintain continued production from the well. That treatment was continued until February 26, D, or for nearly 25 months. During this period, it was necessary to pull the pump on an average of every 2.25 months due to calcium deposition. That treatment was changed to an inhibitor application and this treatment was continued to April 22, E, or for almost 26 months. The treatment with the composition of this invention began on April 22, F. Since the well was not equipped to circulate or fitted for continuous injection of the chemical, it was necessary to batch treat the well by putting from 5 to 10 gallons of fresh water, mixed with one quart of the composition paste, down the casing every day. At the time treatment was started the well was producing between 35 and 40 barrels of water per day and the treatment was about twice the amount normally recommended, but was used to expedite results. The current treatment is one pint per day.

Prior to the beginning of the treatment this well had pumped 33 days from the time the pump was last pulled. Ordinarily it would have been necessary to pull the pump in another one to three months. Forty-two days after treatment was started the pump was pulled for examination. At that time the scale was found to be in a softened, pithy state, so it was concluded that the well was being cleaned. The pump was run and has now been pumping satisfactorily for more than seven months.

Well No. 5

The frequency of pulling jobs increased in 1953 at certain wells and on May 11, 1953, when the tubing was pulled, it was found that the perforations were completely plugged with calcium deposition. On July 18, 1953, treatment with the composition of this invention was commenced. Sufficient time has not elapsed since treatment began to allow definitive evaluation of effects of the material in this well, although daily fluid produced has increased more than 60 percent since the treatment was started.

What is claimed is:

1. A composition for controlling scale formation in systems where conditions are conducive to formation of scale or liquid contacting surfaces which comprises an alkali metal polyphosphate, a polyamino polycarboxylic acid chelating agent, and a cactus extract, the amount thereof being such that the weight ratio of phosphate to chelating agent to cactus extract is in the range from about 1:1:1 to about 10:1:0.1.

2. A composition in accordance with claim 1 in which the ingredients are present in substantially the following weight ratios: 1:1:0.2 to about 10:1:0.1.

3. A composition for controlling scale formation in systems handling water where conditions are conducive to formation to scale, which comprises an alkali metal polyphosphate, a polyamino polycarboxylic acid chelating agent, and cactus extract, in substantially the following proportions by weight: 200 parts of polyphosphate, 50 parts of the normal sodium salt of ethylenediaminetetraacetic acid, 4 parts of the anhydrous cactus extract.

4. A composition in accordance with claim 3 in which the chelating agent is the sodium salt of monoethanolethylenediaminetriacetic acid.

5. A composition in accordance with claim 3 in which the chelating agent is the sodium salt of diethanolethylenediaminediacetic acid.

6. The method of controlling scale formation in oil well flow lines, oil and water treating systems, cooling tower and heat exchanger systems which comprises adding to water circulated through said systems a composition containing the following ingredients in substantially the following proportions by weight:

| | Parts by weight |
|---|---|
| Sodium tripolyphosphate | 1–10 |
| Polyamino polycarboxylic acid chelating agent | 1 |
| Cactus extract | 0.1–1.0 | and relating the amount of said composition to the initial hardness of the water in the system, such that about 1 pound of the composition on a dry weight basis per 200,000–600,000 grains of total water hardness is used.

(References on following page)

References Cited in the file of this patent

UNITED STATES PATENTS

| | | |
|---|---|---|
| 2,012,641 | Smead | Aug. 27, 1935 |
| 2,240,957 | Munz | May 6, 1941 |
| 2,281,392 | Smead et al. | Apr. 28, 1942 |
| 2,429,594 | Case | Oct. 28, 1947 |
| 2,470,132 | Bergman | May 17, 1949 |
| 2,592,511 | Chittum | Apr. 8, 1952 |

OTHER REFERENCES

Versene: Technical Bulletin No. 1, pub. 1949 by Bersworth Chemical Co. of Framingham, Mass. Title page and page 1.